United States Patent
Ishida

(10) Patent No.: US 11,976,493 B2
(45) Date of Patent: May 7, 2024

(54) VEHICLE, AND PARKING FACILITY FOR SAME

(71) Applicant: BRAVE ROBOTICS INC., Tokyo (JP)

(72) Inventor: Kenji Ishida, Tokyo (JP)

(73) Assignee: Brave Robotics Inc., Tokyo (JP)

( * ) Notice: Subject to any disclaimer, the term of this patent is extended or adjusted under 35 U.S.C. 154(b) by 267 days.

(21) Appl. No.: 17/606,097

(22) PCT Filed: Apr. 24, 2020

(86) PCT No.: PCT/JP2020/017868
§ 371 (c)(1),
(2) Date: Mar. 18, 2022

(87) PCT Pub. No.: WO2020/218596
PCT Pub. Date: Oct. 29, 2020

(65) Prior Publication Data
US 2022/0228391 A1    Jul. 21, 2022

(30) Foreign Application Priority Data

Apr. 25, 2019   (JP) ................................. 2019-083752

(51) Int. Cl.
*E04H 6/38* (2006.01)
*B60L 50/60* (2019.01)
(Continued)

(52) U.S. Cl.
CPC ............... *E04H 6/38* (2013.01); *B60L 50/60* (2019.02); *B62D 25/08* (2013.01); *B62D 25/20* (2013.01);
(Continued)

(58) Field of Classification Search
CPC ... B60S 9/218; E04H 6/38; E04H 6/32; E04H 6/42; E04H 6/182; E04H 6/305;
(Continued)

(56) References Cited

FOREIGN PATENT DOCUMENTS

| CN | 201011166 Y | * | 1/2008 |
| CN | 101468781 A | * | 7/2009 |

(Continued)

OTHER PUBLICATIONS

C. Wang, CN 2010 11166Y, Machine English Translation, ip.com (Year: 2008).*

(Continued)

*Primary Examiner* — Karen Beck
(74) *Attorney, Agent, or Firm* — Bay State IP, LLC

(57) ABSTRACT

An object of the instant application is to provide a vehicle that can minimize parking space and a parking facility that can efficiently park a large number of vehicles in a predetermined parking space. The vehicle 1 includes a bottom flap 7 arranged on a bottom surface of a vehicle body and vertically rotatable around a lower rear end of the vehicle body, a rear flap 8, and geared motors 9, 11 for respectively rotating the bottom flap 7 and the rear flap 8. The parking facility 20 for a vehicle 1' is configured to include an erecting mechanism (a rotating member 22, an electric motor 23, and a link mechanism 24) for erecting the vehicle 1' upright with a rear surface facing down, and a transfer mechanism (belt conveyor) 25 for transferring the vehicle 1' erected by the erecting mechanism to a predetermined position.

10 Claims, 10 Drawing Sheets

(51) Int. Cl.
*B62D 25/08* (2006.01)
*B62D 25/20* (2006.01)
*B62D 63/04* (2006.01)
*E04H 6/32* (2006.01)
*E04H 6/42* (2006.01)

(52) U.S. Cl.
CPC ............... *B62D 63/04* (2013.01); *E04H 6/32* (2013.01); *E04H 6/42* (2013.01)

(58) Field of Classification Search
CPC . E04H 6/12; B60L 50/60; B60L 15/20; B62D 25/08; B62D 25/20; B62D 63/04; B62D 31/006; Y02T 90/12; Y02T 90/14; H02J 7/00
See application file for complete search history.

(56) References Cited

FOREIGN PATENT DOCUMENTS

| CN | 202686563 | U |   | 1/2013  |           |
|----|-----------|---|---|---------|-----------|
| CN | 105730554 | A |   | 7/2016  |           |
| CN | 107419932 | A | * | 12/2017 |           |
| CN | 108068775 | A | * | 5/2018  |           |
| CN | 210768038 | U | * | 6/2020  |           |
| DE | 102007062588 | A1 |   | 6/2008 |          |
| JP | S6295948  | U | * | 6/1987  |           |
| JP | S63-167849 | A |  | 7/1988  |           |
| JP | H11334548 | A | * | 12/1999 |           |
| JP | 2004-082827 | A |  | 3/2004 |           |
| JP | 2009-132252 | A |  | 6/2009 |           |
| JP | 2012-010551 | A |  | 1/2012 |           |
| JP | 2012-046997 | A |  | 3/2012 |           |
| JP | 2015-090005 | A |  | 5/2015 |           |
| JP | 2014-159211 | A |  | 10/2016 |           |
| WO | WO-2020218596 | A1 | * | 10/2020 | ............. B60L 50/60 |

OTHER PUBLICATIONS

Z. Chen, CN 108068775A, Machine English Translation, ip.com (Year: 2018).*

Furuta et al. JP 2010 149787, Machine English Translation, ip.com (Year: 2010).*

H. Xiao, CN 105730554, Machine English Translation (Year: 2016).*

Zhang, CN 101468781, Machine English Translation (Year: 2012).*

International Search Report, Japan Patent Office, dated Oct. 29, 2020.

Written Opinion of The International Searching Authority, Japan Patent Office, dated Oct. 29, 2020.

* cited by examiner

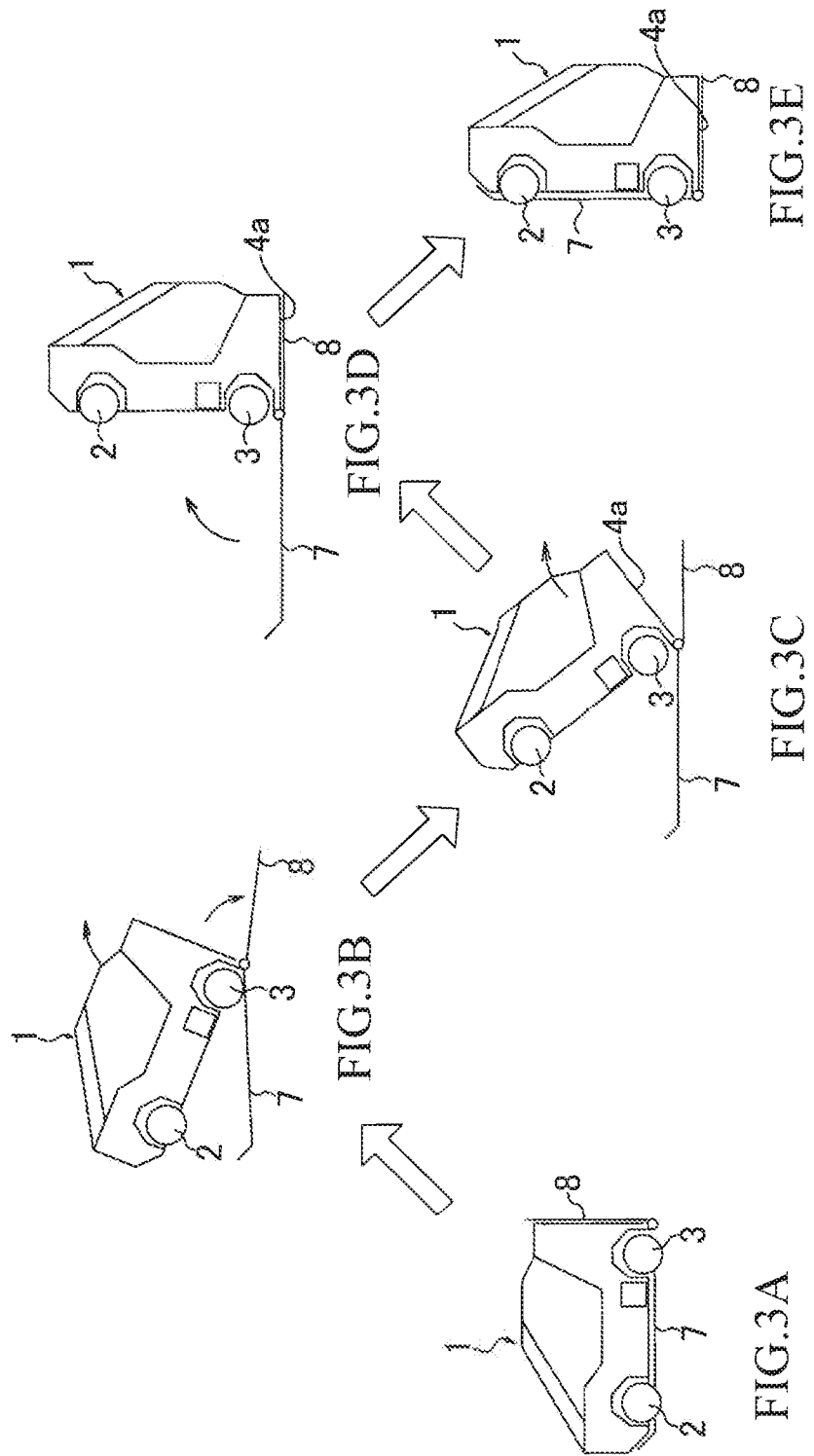

VEHICLE, AND PARKING FACILITY FOR SAME

CROSS REFERENCE TO RELATED APPLICATION

This application is for entry into the U.S. National Phase from which priority is claimed under all applicable sections of Title 35 of the United States Code including, but not limited to, Sections 120, 363, and 365(c) to International Application No. PCT/JP2020/017868 filed on Apr. 24, 2020, and which in turn claims priority under 35 USC 119 to Japanese Patent Application No. 2019-083752 filed on Apr. 25, 2019.

TECHNICAL FIELD

The present invention relates to a vehicle that can be parked while kept standing upright and a parking facility for the vehicle.

BACKGROUND ART

A four- to six-seater standard motor vehicle imposes a heavy burden on users in terms of parking space and maintenance costs. For this reason, in recent years, the development of vehicles called "small mobility" has been progressing. This type of vehicle, for example, is electrically driven for one or two adults, and can be made smaller and lighter than a vehicle equipped with an engine as a drive source.

Meanwhile, in order to promote the spread of this kind of vehicles, it is necessary to solve problems such as securing storage space and parking space in the city.

In light of these problems, Patent Documents 1 and 2 propose a foldable vehicle that can be parked in a small space. Further, Patent Document 3 proposes a parking facility for parking a vehicle on the rooftop of an existing building. This parking facility is configured to be provided with a plurality of columns erected around the existing building for supporting a floorboard covering at least a part of the rooftop of the existing building, and an elevating apparatus for raising and lowering a vehicle between the ground and the floorboard.

RELATED ART DOCUMENTS

Patent Documents

[Patent Document 1] Japanese Unexamined Patent Publication No. 2004-082827
[Patent Document 2] Japanese Unexamined Patent Publication No. 2014-159211
[Patent Document 3] Japanese Unexamined Patent Publication No. 2015-090005

DISCLOSURE OF THE INVENTION

Problems to be Solved by the Invention

However, the vehicles disclosed in Patent Documents 1 and 2 are intended for electric wheelchairs and small caster-type moving objects, but not for vehicles that can travel on general roads in the same manner as a standard motor vehicle. As a side note, a vehicle that can travel in the same manner as a standard motor vehicle is small, but unfoldable as it takes the same form as a standard motor vehicle.

Further, the parking facility disclosed in Patent Document 3 utilizes a rooftop of an existing building as a parking lot for a vehicle, but never specifically reduces parking space for a vehicle. Therefore, the number of vehicles that can be parked in this parking facility is limited.

The present invention has been made in view of the above circumstances, and an object thereof is to provide a vehicle that can minimize its parking space and a parking facility that can efficiently park many vehicles in a predetermined parking space.

Means of Solving the Problems

In order to achieve the above object, a first invention is a vehicle (1) that can stand upright with a rear surface of a vehicle body facing down, characteristically including a bottom flap (7) arranged on a bottom surface of the vehicle body and vertically rotatable around a lower rear end of the vehicle body, and a drive source (9) for rotating the bottom flap (7).

Since the vehicle according to the first invention is parked while kept standing upright with the rear surface facing down, parking space for the vehicle can be minimized. This enables many vehicles to be efficiently parked in a predetermined parking space.

Further, the vehicle (1) may include a rear flap (8) arranged on the rear surface of the vehicle body and vertically rotatable around the lower rear end of the vehicle body, and a drive source (11) for rotating the rear flap (8).

According to the above configuration, if the rear flap rotates to be brought into contact with the ground at the time of parking, the erected vehicle can be stably received by the rear flap (8).

Furthermore, the vehicle (1) may be provided with contact sensors (10, 12) on a bottom surface of the bottom flap (7) and an outer surface of the rear flap (8).

According to the above configuration, when the contact sensors provided on the bottom flap and the rear flap detect a contact with something other than the ground while the bottom flap and the rear flap are in motion, the drive sources for the bottom flap and the rear flap stop operating. Then, the bottom flap and the rear flap are suspended to rotate, ensuring a high degree of safety.

Next, a second invention is a vehicle (1') that can self-travel while kept standing upright with a rear surface of a vehicle body facing down, and characteristically includes a caster (17), a drive wheel (18), and a drive source for rotationally driving the drive wheel (18) on the rear surface of the vehicle body.

According to the second invention, at the time of parking, the erected vehicle can self-travel and be transferred to an optional parking position.

Here, a geared motor may be used as the drive source (9, 11) for self-travelling provided on the bottom flap (7), the rear flap (8), or the vehicle. This can amplify output torque of the motor to transmit to each member.

Further, the vehicle (1, 1', 1") according to the first and second inventions may be configured as an electric vehicle including a rechargeable battery, an electric motor for traveling that is rotationally driven by electric power supplied from the battery, and a power receiving unit (13) for receiving electric power from the outside for charging the battery.

According to the above configuration, the vehicle as an electric vehicle can be reduced in size and weight.

Moreover, a parking facility (20) for the vehicle (1') according to the second invention characteristically includes an erecting mechanism for erecting the vehicle (1') with its rear surface facing down, and a transfer mechanism for transferring the vehicle (1') erected by the erecting mechanism to a predetermined position.

According to the above-described parking facility, at the time of parking, the vehicle erected by the erecting mechanism can be transferred for parking to a predetermined parking position by using the transfer mechanism.

Here, the transfer mechanism may be a belt conveyor (25). According to this, the erected vehicle can be placed on the belt conveyor and then transferred to the predetermined parking position.

Further, the belt conveyor (25) may include a plurality of power transmission units (31) for transmitting power from the outside to the parked vehicle (1'). This configuration enables the battery mounted on the vehicle to be charged during parking.

A third invention is a parking facility (20') for parking a vehicle (1") that can self-travel while kept standing upright characteristically including an erecting mechanism for erecting the vehicle (1") with its rear surface facing down.

According to the third invention, the vehicle erected by the erecting mechanism can self-travel for parking to a predetermined parking position.

Here, the erecting mechanism may include a horizontal base plate (21), a rotating member (22) rotatably supported at one end in the longitudinal direction of the base plate (21) for placing a vehicle (1', 1") before and after erection, an electric motor (23) provided at the other end in the longitudinal direction of the base plate (21), and a link mechanism (24) for connecting an output shaft (23a) of the electric motor (23) to the rotating member (22).

According to the above-described erecting mechanism, the electric motor is driven to move a link member, and the rotating member on which the vehicle before erection is loaded is rotated by approximately 90° by the movement of the link member, thereby enabling the vehicle to be erected vertically with its rear surface facing down.

Here, contact sensor (27, 28) may be provided on the rotating member (22). When the contact sensor provided on the rotating member detects an obstacle during the rotation of the rotating member, the electric motor stops driving and the rotating member stops rotating, ensuring a high degree of safety.

Furthermore, a plurality of power transmission units (31) may be arranged on the base plate (21) of the parking facility (20') for transmitting power from the outside to the parked vehicle (1"). This can charge the battery mounted on the vehicle on the base plate during parking.

Effects of the Invention

According to the present invention, the vehicle can be parked while kept standing upright with its rear surface facing down. This results in minimization of parking space, enabling many vehicles to be efficiently parked in a predetermined parking space.

BRIEF DESCRIPTION OF THE DRAWINGS

FIGS. 3A to 3E are side views schematically showing a process of erecting the vehicle according to the first invention;

MODE FOR CARRYING OUT THE INVENTION

Hereinafter, embodiments of the present invention (namely, first to third inventions) will be described with reference to the accompanying drawings.

Figure 1:
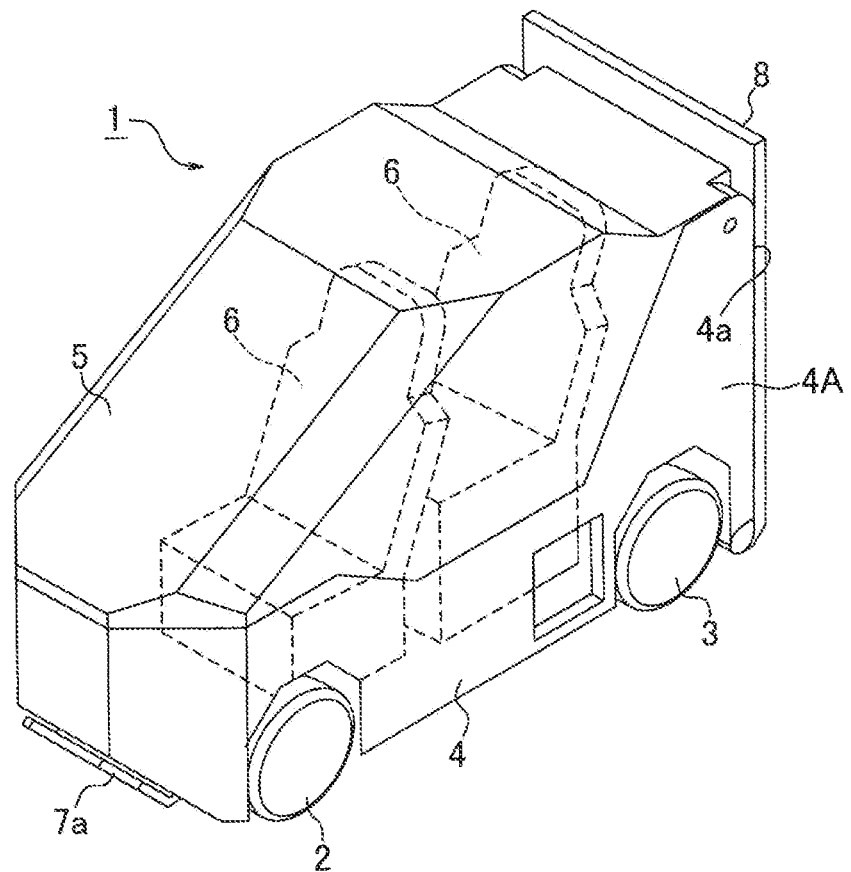
FIG. 1 is a perspective view of a vehicle according to a first invention as viewed from diagonally above forward.
Figure 2:
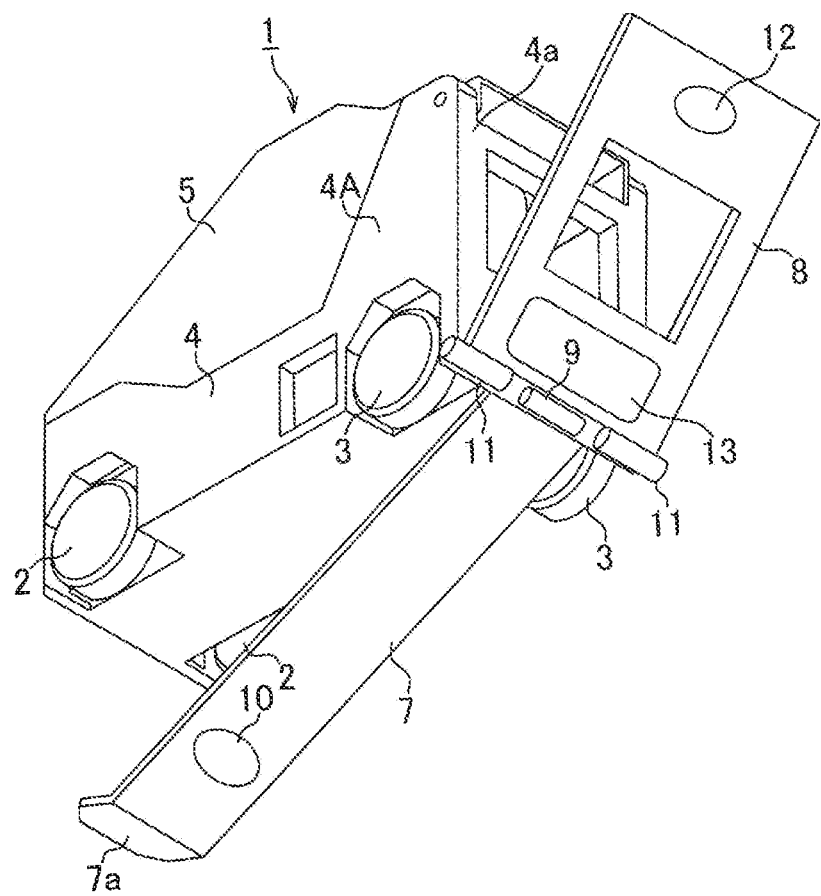
FIG. 2 is a perspective view showing the vehicle according to the first invention with a bottom flap and a rear flap thereof open as viewed from diagonally below rearward.

[First invention] First, an embodiment of the first invention will be described below with reference to FIGS. 1 to 6. FIG. 1 is a perspective view of a vehicle according to the first invention as viewed from diagonally above forward, and FIG. 2 is a perspective view of the vehicle with a bottom flap and a rear flap open as viewed from diagonally below rearward. The vehicle (small vehicle) 1 shown in the figures is a four-wheeled electric vehicle for two adults, equipped with an electric motor as a power source for traveling and a battery for supplying electric power to the electric motor, both of which are not shown in the figures. In this vehicle 1, driving force from the electric motor is transmitted to a pair of left and right front wheels 2 or a pair of rear wheels 3, and the front wheels 2 or rear wheels 3 are rotationally driven, so that the vehicle 1 travels on a road. Therefore, the vehicle 1 shown in the figures as an electric vehicle is configured to be smaller and lighter than a vehicle equipped with an engine as a drive source.

In this vehicle 1, a rear surface 4a of a vehicle body frame 4 made of metal formed into a substantially rectangular box shape forms a flat surface standing vertically, and an upper opening of the vehicle body frame 4 is covered with a flip-up roof 5 that can be opened upward. Here, the roof 5 is made of, for example, lightweight resin, and at least a front surface and left- and right-side surfaces thereof are configured respectively as a transparent front window and transparent side windows. As described above, the vehicle 1 according to the present embodiment provided with the flip-up roof 5 can achieve minimization of a space required for occupants to get on and off the vehicle 1, or in other words, of a space between the vehicle 1 and other vehicles parked around the vehicle 1, as compared with a normal vehicle with doors that open and close to the left and right.

In addition, two seats 6 for seating occupants are arranged in the front and rear of a vehicle interior surrounded by the vehicle body frame 4 and the roof 5 of the vehicle 1.

As will be described later (see FIGS. 3 and 4), the vehicle 1 is erected with the rear surface 4a facing down at the time of parking. In this connection, a reinforcing section 4A in a trapezoidal shape as viewed from the side face is formed on the rear left and right sides near the rear surface 4a of the vehicle body frame 4 so as to sufficiently withstand the self-weight of the erected vehicle 1 that acts when the vehicle 1 stands upright.

Meanwhile, in the vehicle 1 according to the present embodiment, a bottom flap 7 and a rear flap 8 in a rectangular flat plate shape are provided so as to rotate vertically (namely, open and close) around a lower rear end of the vehicle body frame 4. Here, the bottom flap 7 is an elongated member arranged along the front-rear direction between a pair of left and right front wheels 2 arranged in the width direction of the lower surface of the vehicle body frame 4 and between a pair of left and right rear wheels 3 arranged in the width direction of the lower surface of the vehicle body frame 4. A front end 7a of the bottom flap 7 bends diagonally forward upward, and a rear end thereof is pivotally supported on the vehicle body frame 4 so as to rotate vertically. In addition, as shown in FIG. 2, the center in the width direction of the rear end of the bottom surface flap 7 is connected to a geared motor 9 as a drive source provided on the vehicle body frame 4. It should be noted that in the vehicle 1, the bottom flap 7 remains horizontal so as to cover the bottom surface of the vehicle 1 as shown in FIG. 1 except at the time of parking. Further, as shown in FIG. 2, a contact sensor 10 is provided on a part of the bottom surface of the bottom flap 7.

Moreover, the rear flap 8 is configured as a rectangular plate along the outer diameter shape of the rear surface 4a of the vehicle 1. And, as shown in FIG. 2, the left and right sides of the lower end of the rear flap 8 are connected respectively to left and right geared motors 11 serving as drive sources provided on the vehicle body frame 4. As shown in FIG. 1, the rear flap 8 stands vertically and covers the rear surface 4a of the vehicle 1 except at the time of parking. Further, as shown in FIG. 2, a contact sensor 12 is provided on an upper part of the outer surface of the rear flap 8, and a power receiving unit 13 for receiving electric power for charging the battery from the outside is provided on a lower part of the rear flap 8.

As will be described later, the vehicle 1 stands vertically with the rear surface 4a facing down at the time of parking. In this regard, a lithium battery in which no liquid leakage occurs at any position is used in order to prevent liquid leakage in the battery even when the vehicle 1 stands upright. Further, the geared motors 9, 11 are motors as drive sources in which a reduction gear for amplifying drive torque is built.

Next, a parking method of the vehicle 1 configured as described above will be described below with reference to FIGS. 3 and 4.

Figure 4A:
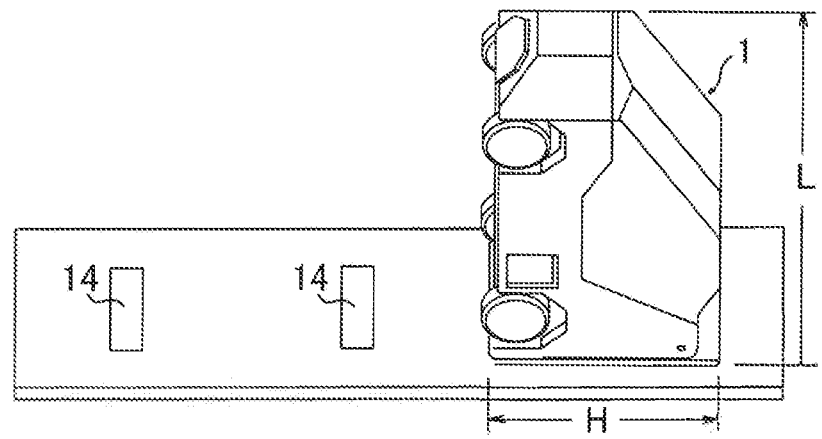
FIGS. 4A to 4C are perspective views showing a process of parking a plurality of the vehicles according to the first invention.
Figure 4B:
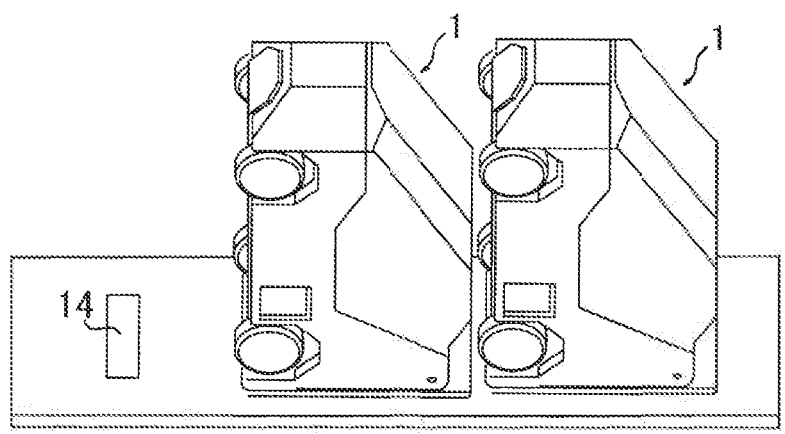
Figure 4C:
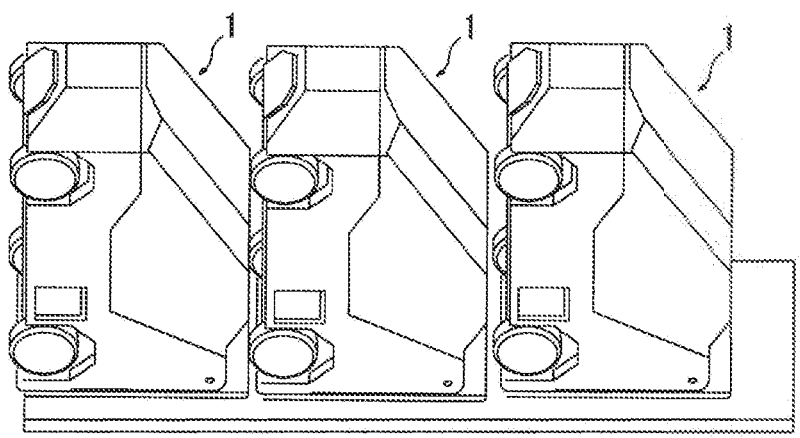

FIGS. 3A to 3E are side views schematically showing a process of erecting the vehicle, and FIGS. 4A to 4C are perspective views showing a process of parking a plurality of the vehicles. As described above, the vehicle 1 is parked while kept standing vertically with the rear surface 4a facing down. In the following, the process of erecting the vehicle 1 will be described with reference to FIGS. 3A to 3E.

As shown in FIG. 3A, when the vehicle 1 reaches a predetermined position in a parking lot, the geared motor 9 shown in FIG. 2 is activated. When the geared motor 9 is driven in this manner, as shown in FIG. 3B, the bottom flap 7 rotates to land on the ground. If the geared motor 9 further continues to be driven from this state, driving force of the geared motor 9 turns into reaction force from the ground to function as power for erecting the vehicle 1, so that the vehicle 1 rotates owing to this power around the lower rear end thereof (namely, around the axial center of the geared motor 9) in the direction of the arrow (namely, clockwise) in FIG. 3B.

Moreover, when the geared motor 11 shown in FIG. 2 is activated, the rear flap 8 rotates (namely, opens) around the lower end (namely, around the axial center of the geared motor 11) in the direction of the arrow in FIG. 3B (namely, clockwise) to touch the ground. It should be noted that in this process, if either or both of the contact sensors 10, 12 provided respectively on the bottom flap 7 and the rear flap 8 detect something other than the ground, the driving of the geared motors 9, 11 stops, the vehicle 1 stops rotating (namely, stops being erected), and the rear flap 8 stops rotating (namely, stops opening) for ensuring a high degree of safety.

After that, when the geared motor 9 continues to be driven, the vehicle 1 stands vertically on the rear flap 8 with the rear surface 4a facing down as shown in FIG. 3D through the process shown in FIG. 3C. After that, when the geared motor 9 is driven to rotate the bottom flap 7 in the direction of the arrow (clockwise) in FIG. 3D, the bottom surface of the vehicle 1 standing vertically is covered with the bottom flap 7 as shown in FIG. 3E, coming to completion of a series of erecting operations conducted on the vehicle 1. Accordingly, the vehicle 1 is parked while kept standing vertically at a predetermined position in the parking lot.

When the series of parking operations as described above are performed on a plurality of the vehicles 1, first, as shown in FIG. 4A, the first vehicle 1 is parked while kept standing vertically at a predetermined position (innermost position) in the parking lot. A plurality of power transmission units 14 (three in the illustrated example) are installed in advance on the floor of the parking lot at predetermined intervals. Electric power is transmitted to the power receiving unit 13 (shown in FIG. 2) of the parked vehicle 1 wirelessly or by wire from the power transmission unit 14. Then, the electric power received by the power receiving unit 13 is used for charging a battery (not shown in the figure) mounted on the vehicle 1. Therefore, the battery mounted on the vehicle 1 is charged during parking.

When the above-described operation is sequentially performed on the second and third vehicles 1, the second and third vehicles 1 are parked while kept standing vertically as shown in FIGS. 4B and 4C in an orderly manner. While FIG. 4C shows how the three vehicles 1 are parked, four or more vehicles 1 can be parked while kept standing vertically by repeating the same operation, and thus the battery mounted on each of these vehicles 1 can be charged during parking.

Meanwhile, since the total height H of the vehicle 1 is smaller than the total length L (H<L as shown in FIG. 4A), when the vehicle 1 is parked while kept standing vertically with the rear surface 4a facing down as in the present embodiment, a large number of the vehicles 1 can be parked more efficiently in a predetermined parking space. In effect, six vehicles 1 can be parked while kept standing upright in a parking space for one ordinary vehicle, which solves difficulties such as securing parking space for the vehicle 1 in the city.

[Second invention] Next, an embodiment of the second invention will be described below with reference to FIGS. 5 to 7.

Figure 5:
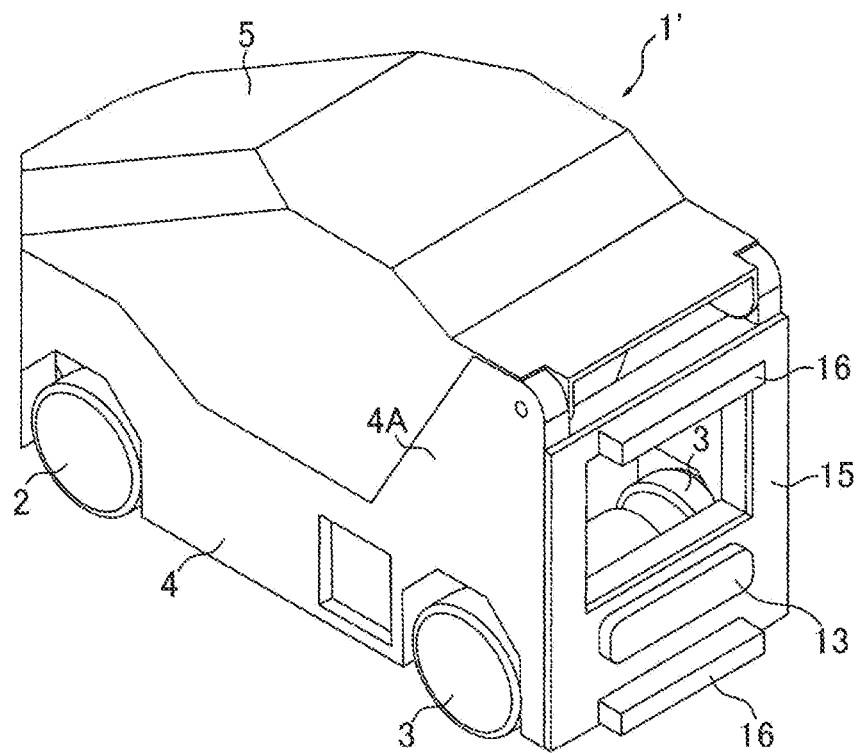
FIG. 5 is a perspective view of a vehicle that is parked in a parking facility according to a second invention as viewed from diagonally above rearward.

FIG. 5 is a perspective view of a vehicle that is parked in a parking facility according to the second invention as viewed from diagonally above rearward. In the illustrated vehicle 1', a rear plate 15 in a rectangular flat plate shape is fixed to a vertical flat rear surface. Since the vehicle 1' according to the present embodiment is also an electric vehicle, its basic configuration is the same as that of the vehicle 1 according to the first embodiment. Therefore, in FIG. 5, the same elements as those shown in FIGS. 1 and 2 are designated by the same reference numerals, and the description thereof will be omitted below.

Meanwhile, on the center in the width direction of the upper and lower ends of the rear plate 15, support bases 16 in a rectangular block shape are fixed along the width direction. And, above the lower support base 16 on the rear plate 15, a power receiving unit 13 is provided for receiving electric power from the outside for charging a battery (not shown in the figure) mounted on the vehicle 1'.

Next, the parking facility 20 for parking the vehicle 1' configured as described above while kept standing vertically will be described below with reference to FIG. 6.

Figure 6:
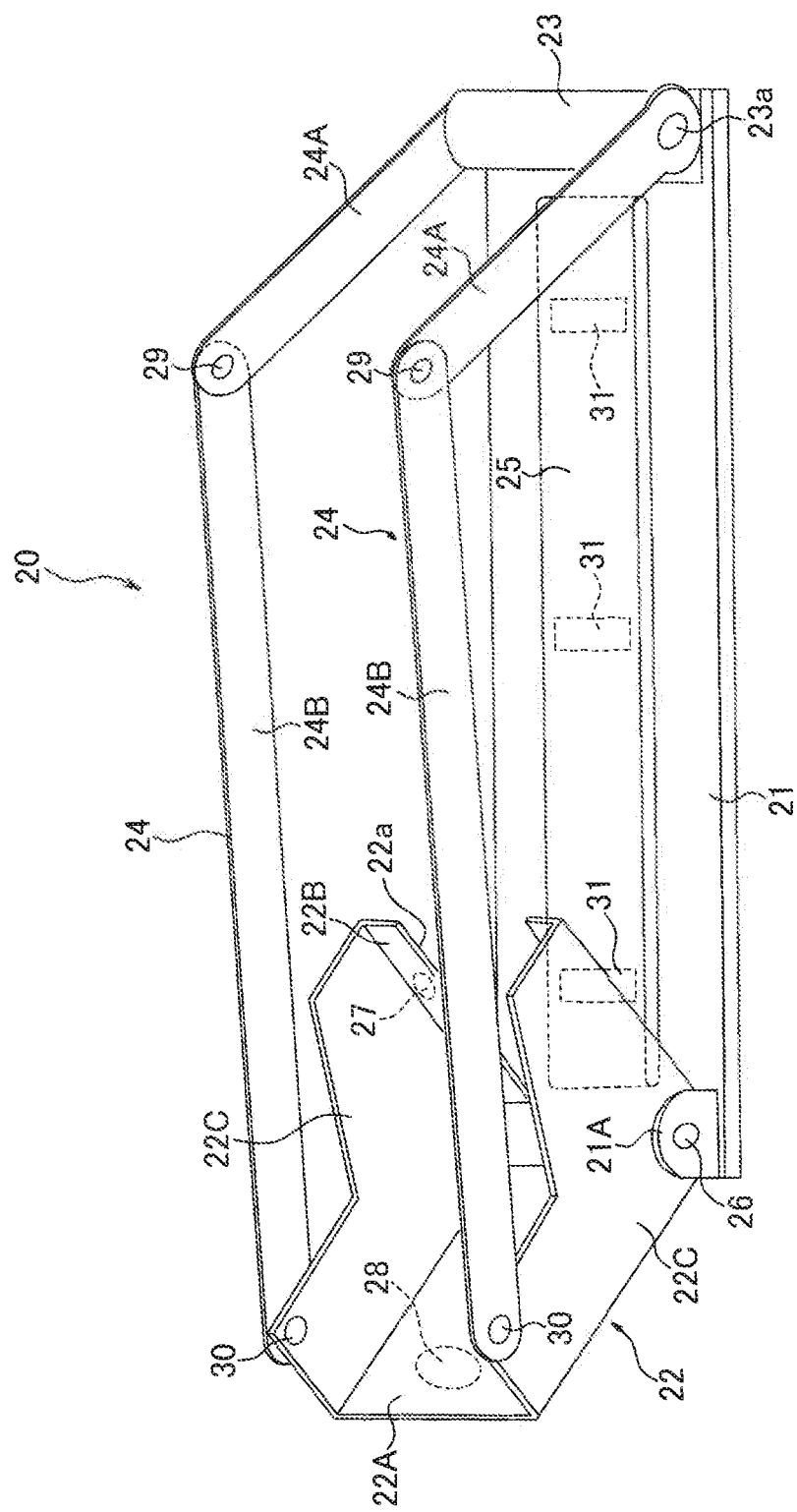
FIG. 6 is a perspective view of the parking facility according to the second invention.

FIG. 6 is a perspective view of the parking facility according to the second invention. The illustrated parking facility 20 is configured to include a base plate 21 in a horizontally elongated shape, a rotating member 22 pivotally supported at one end in the longitudinal direction of the base plate 21 (namely, at the left end in FIG. 6) so as to rotate vertically, an electric motor 23 serving as a drive source arranged at the other end in the longitudinal direction of the base plate 21 (namely, at the right end in FIG. 6), a pair of left and right link mechanisms 24 for connecting an output shaft 23a of the electric motor 23 to the rotating member 22, and a belt conveyor 25 arranged on the center in the width direction of the base plate 21 along the longitudinal direction thereof.

The rotating member 22 constitutes an erecting mechanism for vertically erecting the vehicle 1' at the time of parking, and includes a plate 22A on which the vehicle 1' before erection is placed, a plate 22B, forming a right angle with the plate 22A, on which the vehicle 1' after erection is placed, and left and right-side plates 22C respectively connecting the left and right-side ends of these plates 22A, 22B to each other. The rotating member 22 is supported on the base plate 21 by a shaft 26 inserted into the base ends (namely, corners) of the left and right-side plates 22C in the width direction so as to rotate vertically. More specifically, a pair of brackets 21A are erected on the left and right sides of the one end in the longitudinal direction of the base plate 21, and these brackets 21A rotatably supports both left and right ends of the shaft 26. In this manner, the rotating member 22 is pivotally supported on the base plate 21 so as to rotate vertically.

Here, a notch 22a in a rectangular shape is formed on the plate 22B of the rotating member 22 for preventing interference with the belt conveyor 25. And, a contact sensor 27 is provided on the outer surface of the left and right sides of the plate 22B so as to sandwich the notch 22a on the plate 22B. Further, a contact sensor 28 is also provided on the center in the width direction of the outer surface of the other plate 22A.

The electric motor 23 is arranged at the other end in the longitudinal direction of the base plate 21 (shown at the right end in FIG. 6) horizontally along the width direction. And, one ends of link members 24A constituting the left and right link mechanisms 24 are bonded to both ends of the output shaft 23a longer in the width direction of the base plate 21.

Here, each of the left and right link mechanisms 24 is configured by rotatably connecting two link members 24A, 24B to each other by a shaft 29. And, the one end of the link member 24A is bonded to the output shaft 23a of the motor 23b as described above, and one end of the other link member 24B is rotatably connected to an end of the side plate 22C of the rotating member 22 by a shaft 30.

Since the belt conveyor 25 is conventionally known, detailed descriptions of its configuration will be omitted. But, in general, it is configured so that an endless strip belt is wound between a drive roller and a driven roller (not shown in the figure) arranged in parallel with each other, and the strip belt moves by rotationally driving the drive roller with an electric motor serving as a drive source (not shown in the figure). Additionally, a plurality of power transmission units 31 (three in the illustrated example) are built in the belt conveyor 25 at appropriate intervals in the longitudinal direction.

Next, a method of parking the vehicle 1' shown in FIG. 5 by using the parking facility 20 shown in FIG. 6 will be described below with reference to FIGS. 7A to 7E.

FIGS. 7A to 7E are perspective views showing a process of parking a plurality of the vehicles 1', where the plurality of the vehicles 1' are parked while kept standing vertically by using the parking facility 20 shown in FIG. 6.

Figure 7A:
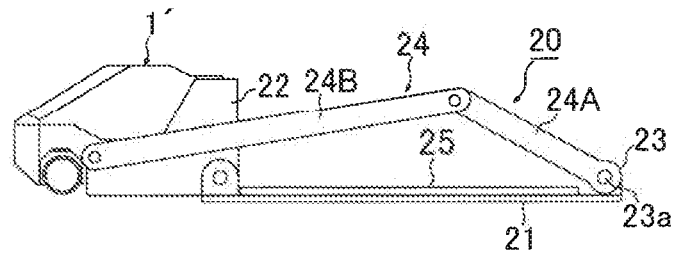
FIGS. 7A to 7E are side views showing a process of parking a plurality of the vehicles in the parking facility according to the second invention.

Namely, before the vehicle 1' is erected vertically, the rotating member 22 of the parking facility 20 is maintained in such a posture that the plate 22A is horizontal as shown in FIG. 7A. And, the vehicle 1' transferred to the parking facility 20 is moved and then placed onto the horizontal plate 22A of the rotating member 22 of the parking facility 20.

Figure 7B:
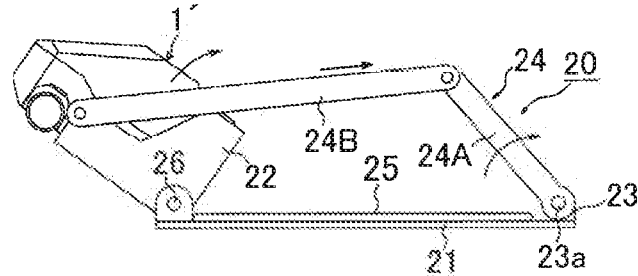
Figure 7C:
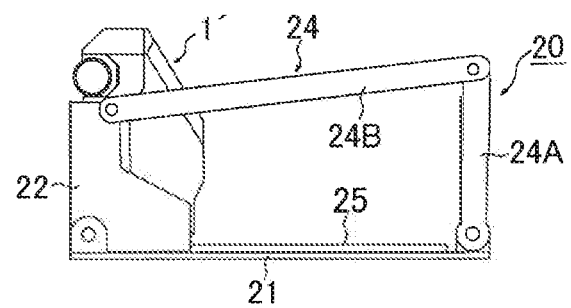

In the above-described state, when the electric motor 23 of the parking facility 20 is driven to rotate the output shaft 23a of the electric motor 23 and then rotate the link member 24A of each of the left and right link mechanisms 24 around the output shaft 23a of the electric motor 23 in the direction of the arrow shown in the figure (namely, clockwise) as shown in FIG. 7B, the other link member 24B is pulled in the direction of the arrow shown in FIG. 7B, thereby rotating the rotating member 22 in the direction of the arrow (namely, clockwise) around the shaft 26. When this operation continues to be performed, the vehicle 1' eventually stands vertically as shown in FIG. 7C to be placed on the plate 22B of the rotating member 22 with its rear surface facing down. At this point, the vehicle 1' is placed on the horizontal plate 22B of the rotating member 22 via the support base 16 projecting from the rear plate 15 fixed to the rear surface of the vehicle 1'. In this process, if either or both of the contact sensors 28, 27 provided respectively on the plates 22A, 22B of the rotating member 22 detect something other than the base plate 21, the driving of the electric motor 23 is stopped, and then the vehicle 1' stops rotating (namely, stops being erected) for ensuring a high degree of safety.

Figure 7D:
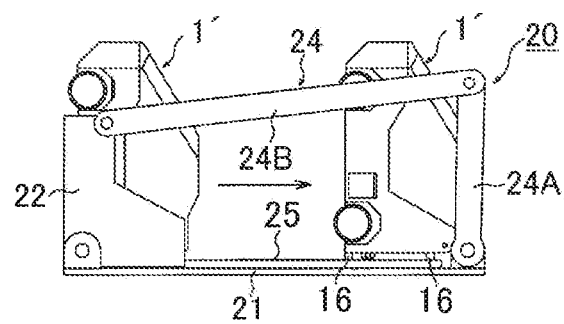

As described above, when the vehicle 1' stands vertically on the plate 22B of the rotating member 22, the belt conveyor 25 is driven to transfer the vehicle 1' standing vertically to the innermost part of the base plate 21 (namely, to the right end of FIG. 7D) as shown in FIG. 7D, so that the vehicle 1' is parked while kept standing vertically on the base plate 21 of the parking facility 20. Then, electric power is transmitted wirelessly or by wire from the transmission unit 31 built in the belt conveyor 25 to the power receiving unit 13 (see FIG. 5) of the parked vehicle 1', and the electric power received by the power receiving unit 13 is used to charge a battery (not shown in the figure) mounted on the vehicle 1'. In this manner, the battery of the vehicle 1' is charged during parking.

Figure 7E:
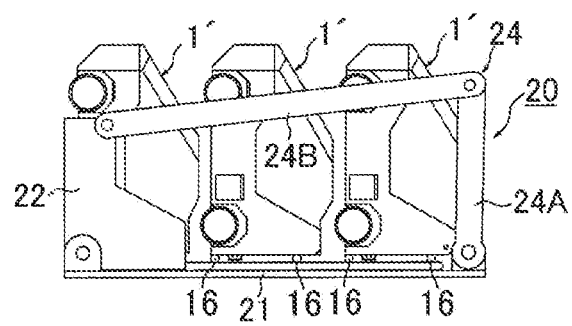

When the above-described operation is sequentially performed on the second and third vehicles 1', the second and third vehicles 1' are parked while kept standing vertically as orderly as shown in FIG. 7E. It should be noted that while FIG. 7E shows how the three vehicles 1' are parked, by lengthening the base plate 21 of the parking facility 20 and repeating the same operation, a plurality of four or more vehicles 1' can be parked while kept standing vertically, and the battery mounted on each of the vehicles 1' can be charged during parking.

Meanwhile, since the total height of the vehicle 1' is smaller than the total length, when the vehicle 1' is parked while kept standing vertically with the rear surface facing down as in the present embodiment, a large number of the vehicles 1' can be parked more efficiently in a predetermined parking space. This can solve problems such as securing parking space for this type of vehicle 1' in the city.

[Third invention] Next, an embodiment of the third invention will be described below with reference to FIGS. 8 to 10.

Figure 8:
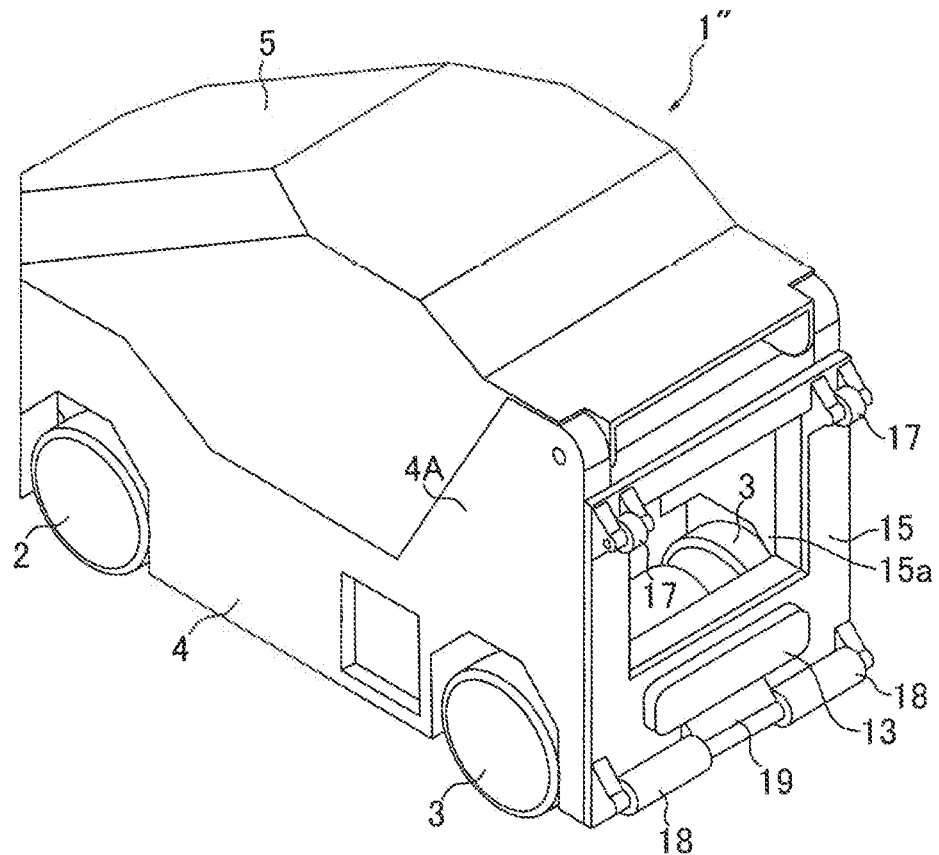
FIG. 8 is a perspective view of a vehicle according to a third invention as viewed from diagonally above rearward.

FIG. 8 is a perspective view of a vehicle parked in a parking facility according to the third invention as viewed from diagonally above rearward. In the illustrated vehicle 1", a rear plate 15 in a rectangular flat plate shape is fixed to a vertical flat rear surface. Since the vehicle 1" according to the present embodiment is also an electric vehicle, and its basic configuration is the same as that of the vehicle 1 according to the first embodiment. Therefore, in FIG. 8, the same elements as those shown in FIGS. 1 and 2 are designated by the same reference numerals, and the description thereof will be omitted below.

Meanwhile, a caster 17 is rotatably arranged on both left and right sides of the upper end of the rear plate 15, and a drive wheel 18 is rotatably arranged on both left and right sides of the lower end of the rear plate 15. Here, the left and right drive wheels 18 are rotationally driven by a geared motor (not shown in the figure) built in a motor case 19 fixed between both drive wheels 18 at the lower end of the rear plate 15. Further, a rectangular opening window 15a is formed on the center in the width direction of the upper half of the rear plate 15, and a power receiving unit 13 for receiving electric power for charging a battery (not shown in the figure) mounted on the vehicle 1" is provided below the opening window 15a of the rear plate 15.

Next, a parking facility 20' for parking the vehicle 1" configured as described above while kept standing vertically will be described below with reference to FIG. 9.

Figure 9:
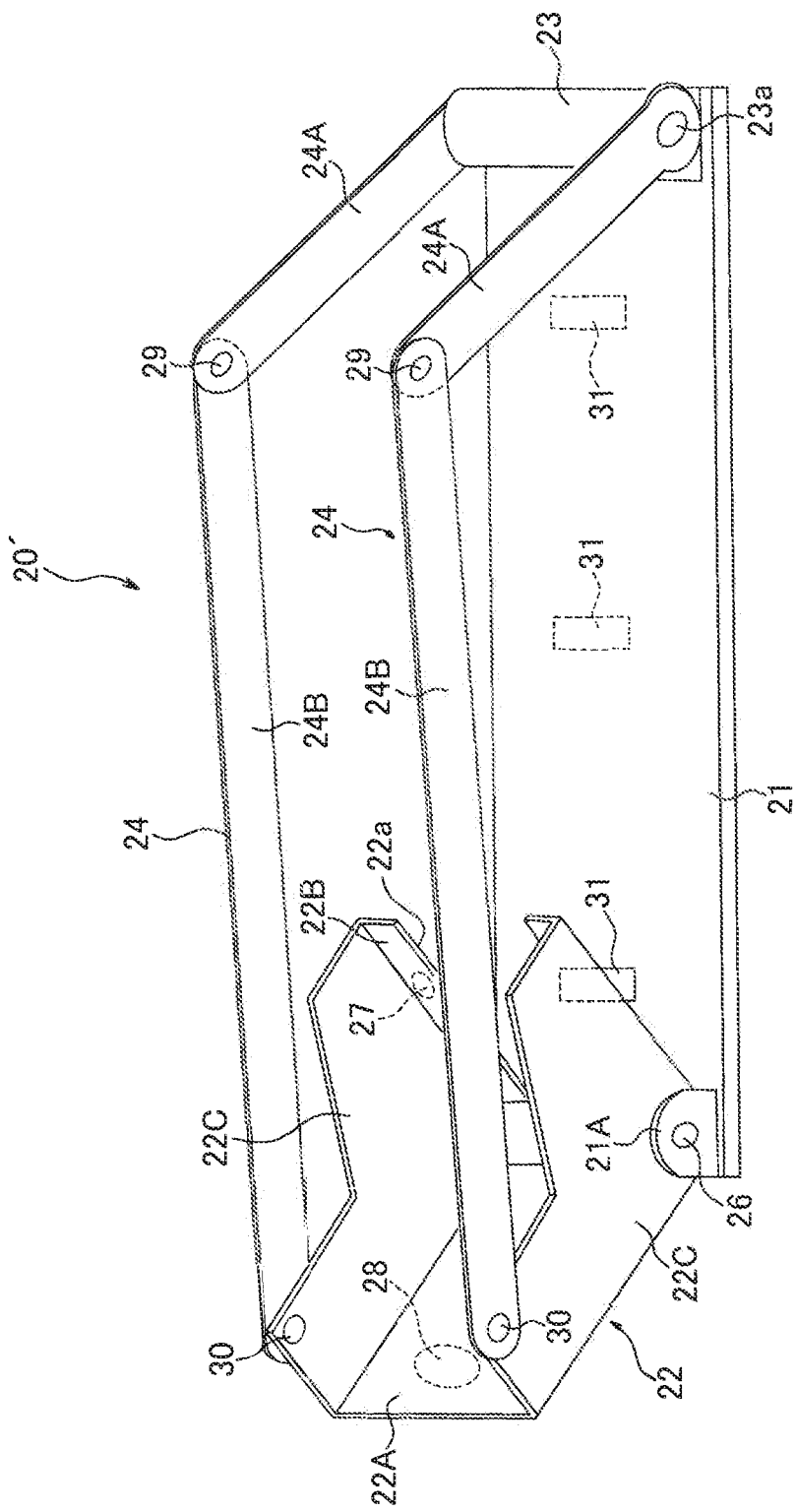
FIG. 9 is a perspective view of a parking facility according to the third invention.

FIG. 9 is a perspective view of the parking facility according to the third invention, and the basic configuration of the illustrated parking facility 20' is the same as that of the parking facility 20 according to the second invention shown in FIG. 6. Therefore, in FIG. 9, the same elements as those shown in FIG. 6 are designated by the same reference numerals, and the description thereof will be omitted below.

Similarly to the parking facility 20 according to the second invention shown in FIG. 6, the parking facility 20' according to the third invention shown in FIG. 9 is also configured to include a horizontally elongated rectangular base plate 21, a rotating member 22 supported at one end in the longitudinal direction of the base plate 21 (namely, at the left end in FIG. 9) so as to rotate in the vertical direction, an electric motor 23 serving as a drive source arranged at the other end in the longitudinal direction of the base plate 21 (namely, at the right end in FIG. 9), and a pair of left and right link mechanisms 24 for connecting an output shaft 23a of the electric motor 23 to the rotating member 22. However, the parking facility 20' includes no belt conveyor such as the belt conveyor 25 provided in the parking facility 20 according to the second invention (see FIG. 6). It should be noted that a plurality (three in the illustrated example) of power transmission units 31 are arranged on the base plate 21 at appropriate intervals in the longitudinal direction.

Next, a method of parking the vehicle 1" shown in FIG. 8 by using the parking facility 20' shown in FIG. 9 will be described below with reference to FIGS. 10A to 10E.

FIGS. 10A to 10E are side views showing a process of parking a plurality of the vehicles 1", where the vehicle 1" is parked while kept standing vertically by the parking facility 20' shown in FIG. 9.

Figure 10A:
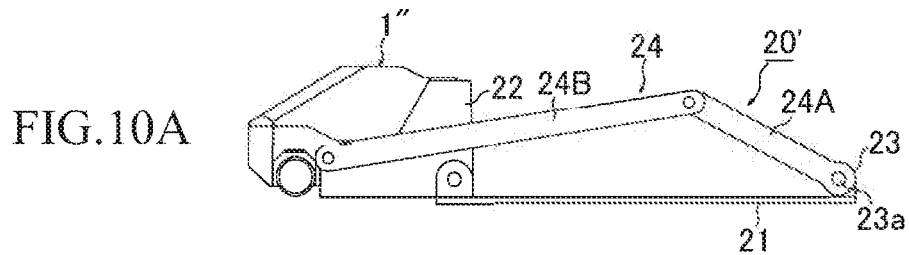
FIGS. 10A to 10E are side views showing a process of parking a plurality of the vehicles in the parking facility according to the third invention.
Figure 10B:
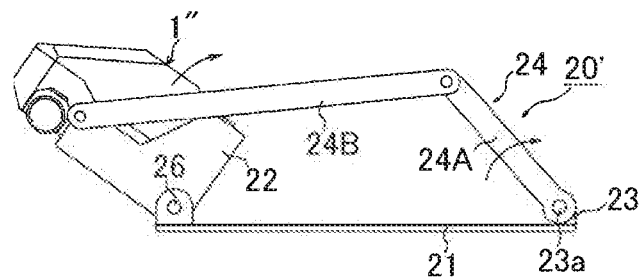
Figure 10C:
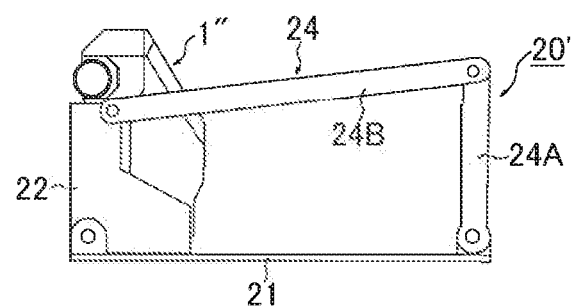

Namely, through the same process shown in FIGS. 10A to 10C as the process in the parking facility 20 according to the second invention as shown in FIGS. 7A to 7C, the vehicle 1" is erected vertically on the base plate 21 of the parking facility 20' with its rear surface facing down. In this state, the vehicle 1" stands vertically on the base plate 21 via the pair of the left and right casters 17 and the pair of the left and right drive wheels 18 rotatably provided on the rear plate 15 (see FIG. 10C).

Figure 10D:
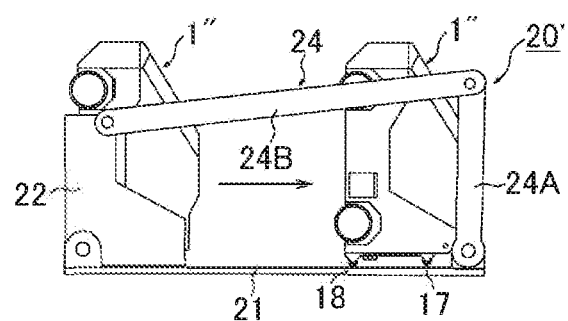

Next, when a geared motor (not shown in the figure) provided on the rear plate 15 is activated in the above-described state, the pair of the left and right drive wheels 18 are rotationally driven by the geared motors, so that as shown in FIG. 10D, the vehicle 1" is transferred on the base plate 21 of the parking facility 20' in the direction of the back side (namely, in the direction of the arrow in the figure), and thus stands upright at a predetermined position. Then, electric power is transmitted wirelessly or by wire from a power transmission unit 31 installed on the base plate 21 to the power receiving unit 13 (see FIG. 8) of the parked vehicle 1". The electric power received by the power receiving unit 13 is used to charge a battery (not shown in the figure) mounted on the vehicle 1". Therefore, the battery of the vehicle 1" is charged during parking.

Figure 10E:
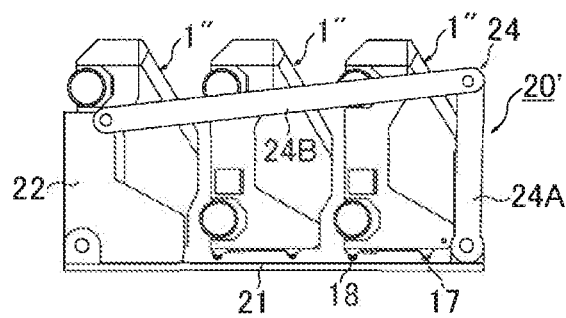

When the above-described operation is sequentially performed to the second and third vehicles 1", the second and third vehicles 1" are parked while kept standing vertically as orderly as shown in FIG. 10E. It should be noted that while FIG. 10E shows how the three vehicles 1" are parked, by lengthening the base plate 21 of the parking facility 20' and repeating the same operation, a plurality of four or more vehicles 1" can be parked while kept standing vertically, and the battery mounted on each vehicle 1" can be charged during parking.

Therefore, since similarly to the parking facility 20 according to the second invention (see FIG. 6), the parking facility 20' according to the third invention also enables the vehicle 1" to be orderly parked while kept standing vertically with the rear surface facing down, a large number of the vehicles 1" can be parked more efficiently in a predetermined parking space. This can solve problems such as securing parking space for this type of vehicle 1" in the city.

It should be noted that the first to third inventions described above are not limited to the embodiments described above, and may vary within the scope of the claims and the technical ideas described in the specification and the drawings.

The invention claimed is:

1. A vehicle that can stand upright with a rear surface of a vehicle body facing down, the vehicle comprising:
   a bottom flap arranged on a bottom surface of the vehicle body and vertically rotatable around a lower rear end of the vehicle body;
   a drive source for rotating the bottom flap;
   a rear flap arranged on a rear surface of the vehicle body and vertically rotatable around the lower rear end of the vehicle body; and
   a drive source for rotating the rear flap.

2. The vehicle according to claim 1, wherein a contact sensor is provided on a bottom surface of the bottom flap and an outer surface of the rear flap.

3. A vehicle that can self-travel while kept standing upright with a rear surface of a vehicle body facing down, the vehicle comprising:
- a caster;
- a drive wheel; and
- a drive source for rotationally driving the drive wheel, the caster, the drive wheel, and the drive source provided on the rear surface of the vehicle body,
- wherein a parking facility for parking the vehicle while kept standing upright with the rear surface of the vehicle facing down, the vehicle parking facility comprising an erecting mechanism for erecting the vehicle with the rear surface of the vehicle facing down,
- wherein the erecting mechanism comprises:
- a horizontal base plate on which at least two vehicles can be parked;
- a rotating member vertically rotatably supported at one end in the longitudinal direction of the base plate for mounting a vehicle before and after erection;
- an electric motor provided at the other end in the longitudinal direction of the base plate; and
- a link mechanism for connecting an output shaft of the electric motor to the rotating member.

4. The vehicle according to claim 1, wherein the drive source is a geared motor.

5. The vehicle according to claim 1, further comprising:
- a rechargeable battery;
- an electric motor for traveling, the electric motor rotationally driven with electric power supplied from the battery; and
- a power receiving unit for receiving electric power from outside for charging the battery.

6. A parking facility for parking a vehicle while kept standing upright with a rear surface of the vehicle facing down, the parking facility comprising:
- an erecting mechanism for erecting the vehicle with the rear surface of the vehicle facing down;
- a transfer mechanism for transferring the vehicle erected by the erecting mechanism to a predetermined position,
- wherein the erecting mechanism comprises:
- a horizontal base plate on which at least two vehicles can be parked;
- a rotating member vertically rotatably supported at one end in the longitudinal direction of the base plate for mounting a vehicle before and after erection;
- an electric motor provided at the other end in the longitudinal direction of the base plate; and
- a link mechanism for connecting an output shaft of the electric motor to the rotating member.

7. The parking facility according to claim 6, wherein the transfer mechanism is a belt conveyor.

8. The parking facility according to claim 7, wherein a plurality of power transmission units for transmitting electric power to the parked vehicle from outside are built in the belt conveyor.

9. The vehicle parking facility according to claim 6, wherein a contact sensor is provided on the rotating member.

10. The vehicle parking facility according to claim 6, wherein a plurality of power transmission units for transmitting electric power to the parked vehicle from outside are arranged on the base plate.

* * * * *